United States Patent
Yamagishi

(10) Patent No.: US 9,260,592 B2
(45) Date of Patent: *Feb. 16, 2016

(54) CHLOROPRENE RUBBER COMPOSITION, AND VULCANIZATES AND MOLDINGS THEREOF

(75) Inventor: Uichiro Yamagishi, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/884,458

(22) PCT Filed: Sep. 12, 2011

(86) PCT No.: PCT/JP2011/070717
§ 371 (c)(1),
(2), (4) Date: May 9, 2013

(87) PCT Pub. No.: WO2012/063548
PCT Pub. Date: May 18, 2012

(65) Prior Publication Data
US 2013/0231443 A1 Sep. 5, 2013

(30) Foreign Application Priority Data
Nov. 12, 2010 (JP) .................. 2010-253788

(51) Int. Cl.
*C08L 11/00* (2006.01)
*C08L 9/00* (2006.01)
*C08K 5/40* (2006.01)
*C08K 5/405* (2006.01)

(52) U.S. Cl.
CPC . *C08L 9/00* (2013.01); *C08L 11/00* (2013.01); *C08K 5/40* (2013.01); *C08K 5/405* (2013.01)

(58) Field of Classification Search
CPC ........... C08L 11/00; C08L 7/00; C08L 23/32; C08L 2205/02; C08L 23/28; C08L 23/26; C08L 5/405
USPC .................. 525/193, 232, 237; 524/575.5
See application file for complete search history.

(56) References Cited

U.S. PATENT DOCUMENTS

| | | | | |
|---|---|---|---|---|
| 3,988,506 A | * | 10/1976 | Dohi et al. | 526/219.5 |
| 6,812,288 B2 | * | 11/2004 | Kobayashi et al. | 525/201 |
| 8,283,392 B2 | * | 10/2012 | Datta et al. | 523/211 |
| 2013/0253138 A1 | * | 9/2013 | Yamagishi et al. | 525/96 |

FOREIGN PATENT DOCUMENTS

| | | |
|---|---|---|
| CN | 101353453 A | 1/2009 |
| JP | 6-279621 | 10/1994 |
| JP | 9-278946 | 10/1997 |
| JP | 11-49923 | 2/1999 |
| JP | 11-153169 | 6/1999 |
| JP | 2000-313770 | 11/2000 |
| JP | 2003-292681 | 10/2003 |
| JP | 2008-195870 | 8/2008 |
| JP | 2009-197127 | 9/2009 |

OTHER PUBLICATIONS

Chinese Notice of Reason for Rejection dated May 15, 2014 for Chinese Application No. 201180054404.7.

* cited by examiner

*Primary Examiner* — Nathan M Nutter
(74) *Attorney, Agent, or Firm* — Stein IP, LLC

(57) ABSTRACT

To provide a chloroprene rubber composition that provides excellent low temperature characteristics such as low temperature permanent compression set and dynamic characteristics at low temperature and provides good permanent compression set, mechanical strength, and processing characteristics also at high temperature thus to achieve excellent characteristics within a wide temperature region, and a vulcanizate and a molding thereof.

To a chloroprene rubber including a 2,3-dichlorobutadiene unit in an amount of 5 to 20% by mass, a natural rubber is added so as to give a ratio (chloroprene rubber/natural rubber) of 60/40 to 95/5 by mass ratio. Then, with respect to 100 parts by mass of the rubber components, ethylene thiourea is added in an amount of 0.1 to 3.0 parts by mass and dipentamethylenethiuram tetrasulfide is added in an amount of 0.1 to 3.0 parts by mass, thereby preparing the chloroprene rubber composition.

12 Claims, No Drawings

CHLOROPRENE RUBBER COMPOSITION, AND VULCANIZATES AND MOLDINGS THEREOF

CROSS-REFERENCE TO RELATED APPLICATIONS

This application is a national stage application of PCT Application No. PCT/JP2011/070717, filed Sep. 12, 2011, which claims the benefit of Japanese Application No. JP2010-253788, filed Nov. 12, 2010, in the Japanese Intellectual Property Office, the disclosures of which are incorporated herein by reference.

BACKGROUND OF THE INVENTION

1. Field of the Invention

The present invention relates to a chloroprene rubber composition, a vulcanizate thereof, and molding using them. More specifically, the present invention relates to a chloroprene rubber composition used for rubber moldings such as a wiper blade and a vibration isolator.

2. Description of the Related Art

Chloroprene rubber is excellent in heat resistance, weather resistance, ozone resistance, chemical resistance, and other properties and has been used in wide variety of fields such as general industrial rubber products, automobile parts, and adhesives. Such a chloroprene rubber molded piece is typically produced by molding a chloroprene rubber composition including a chloroprene rubber in combination with a vulcanizing agent, a vulcanization accelerator, a filler, and other components into a predetermined shape and then vulcanization.

Examples of the vulcanization accelerator used for such a production process include a thiourea vulcanization accelerator, a thiazole vulcanization accelerator, a thiuram vulcanization accelerator, and a guanidine vulcanization accelerator (for example, see Patent Document 1). For example, in a chloroprene rubber composition described in Patent Document 1, combination use of a thiourea vulcanization accelerator and a thiuram vulcanization accelerator intends to improve both scorch stability and permanent compression set characteristics.

Meanwhile, the chloroprene rubber is inferior in low temperature characteristics. To address the problem, chloroprene rubber compositions have been developed for improving low temperature resistivity (see Patent Documents 2 and 3). In addition, a high damping rubber composition has been developed (see Patent Document 4). The composition includes a natural rubber and a chloroprene rubber, and the natural rubber alone is vulcanized, thus improving damping characteristics.

CITATION LIST

Patent Literatures

[Patent Document 1] Japanese Unexamined Patent Application Publication No. 6-279621
[Patent Document 2] Japanese Unexamined Patent Application Publication No. 2000-313770
[Patent Document 3] Japanese Unexamined Patent Application Publication No. 2003-292681
[Patent Document 4] Japanese Unexamined Patent Application Publication No. 11-153169

SUMMARY OF THE INVENTION

However, the conventional chloroprene rubber compositions described above provide insufficient low temperature characteristics, especially provide insufficient anti-crystallization properties of a vulcanized molding of the composition and have a problem of inferior permanent compression set and dynamic characteristics at low temperature.

To solve such a problem, the present invention has an object to provide a chloroprene rubber composition that can provide excellent low temperature characteristics such as low temperature permanent compression set and dynamic characteristics at low temperature and can provide good permanent compression set, mechanical strength, and processing characteristics also at high temperature thus to achieve excellent characteristics within a wide temperature region, and a vulcanizate and a molding thereof.

A chloroprene rubber composition of the present invention includes a chloroprene rubber and a natural rubber in a total amount of 100 parts by mass, ethylene thiourea in an amount of 0.1 to 3.0 parts by mass, and dipentamethylenethiuram tetrasulfide in an amount of 0.1 to 3.0 parts by mass, the chloroprene rubber including a 2,3-dichlorobutadiene unit in an amount of 5 to 20% by mass, and the blending ratio of the chloroprene rubber and the natural rubber (chloroprene rubber/natural rubber) being 60/40 to 95/5 by mass ratio.

In the present invention, the chloroprene rubber composition, which includes a chloroprene rubber in combination with a natural rubber and further includes ethylene thiourea and dipentamethylenethiuram tetrasulfide in particular amounts, can provide a vulcanized molding having improved low temperature characteristics.

A vulcanizate of the present invention is obtained by vulcanization of the chloroprene rubber composition.

In the present invention, the vulcanizate, which uses the chloroprene rubber composition including a natural rubber in a particular ratio and further including ethylene thiourea and dipentamethylenethiuram tetrasulfide as vulcanization accelerators, can obtain excellent characteristics within a wide region from a low temperature to a high temperature.

A molding of the present invention is obtained by vulcanization of the chloroprene rubber composition after or during molding of the composition.

The present invention uses a chloroprene rubber in combination with a natural rubber in a particular ratio and further uses ethylene thiourea and dipentamethylenethiuram tetrasulfide as vulcanization accelerators. This allows an obtained molding to have excellent low temperature characteristics such as low temperature permanent compression set and dynamic characteristics at low temperature and good permanent compression set, mechanical strength, and processing characteristics also at high temperature thus to obtain excellent characteristics within a wide temperature region.

Additional aspects and/or advantages of the invention will be set forth in part in the description which follows and, in part, will be obvious from the description, or may be learned by practice of the invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Embodiments for carrying out the present invention will now be described in detail. However, the present invention is not intended to be limited to the embodiments described below.

(First Embodiment)

First, a chloroprene rubber composition of a first embodiment of the present invention will be described. The chloroprene rubber composition of the embodiment is a blend rubber composition including a chloroprene rubber and a natural rubber as rubber components. The composition further includes ethylene thiourea in an amount of 0.1 to 3.0 parts by mass and dipentamethylenethiuram tetrasulfide in an amount of 0.1 to 3.0 parts by mass with respect to 100 parts by mass of these rubber components (chloroprene rubber and natural rubber).

[Rubber Component]

The chloroprene rubber included in the chloroprene rubber composition of the embodiment is a copolymer of chloroprene (2-chloro-1,3-butadiene) and 2,3-dichlorobutadiene and includes a 2,3-dichlorobutadiene unit in an amount of 5 to 20% by mass. The amount of the 2,3-dichlorobutadiene unit in the chloroprene rubber affects anti-crystallization properties and brittleness temperature of a vulcanizate or a vulcanized molding obtained by vulcanization of the chloroprene rubber composition. The anti-crystallization properties of the vulcanizate or the vulcanized molding then affect curing speed when the vulcanizate or the vulcanized molding is left in a low temperature condition. The brittleness temperature affects brittleness of the vulcanizate or the vulcanized molding at a low temperature.

On this account, a chloroprene rubber including the 2,3-dichlorobutadiene unit in an amount of less than 5% by mass provides a vulcanizate or a vulcanized molding having insufficient anti-crystallization properties. A chloroprene rubber including the 2,3-dichlorobutadiene unit in an amount of more than 20% by mass provides a vulcanizate or a vulcanized molding having an increased brittleness temperature, thus deteriorating the brittleness at a low temperature. In contrast, a chloroprene rubber including the 2,3-dichlorobutadiene unit in an amount of 5 to 20% by mass allows a vulcanizate and a vulcanized molding to obtain a good balance between the anti-crystallization properties and the brittleness temperature.

The chloroprene rubber used in the chloroprene rubber composition of the embodiment may be a copolymer including other monomers in addition to 2,3-dichlorobutadiene described above. Examples of the monomer copolymerizable with chloroprene include acrylic acid esters such as methyl acrylate, butyl acrylate, and 2-ethylhexyl acrylate; methacrylic acid esters such as methyl methacrylate, butyl methacrylate, and 2-ethylhexyl methacrylate; hydroxy(meth)acrylates such as 2-hydroxyethyl (meth)acrylate, 2-hydroxymethyl (meth)acrylate, and 2-hydroxypropyl (meth)acrylate; and 2,3-dichloro-1,3-butadiene, 1-chloro-1,3-butadiene, butadiene, isoprene, ethylene, styrene, and acrylonitrile.

The natural rubber included in the chloroprene rubber composition of the embodiment is not particularly limited and known natural rubbers can be used. Blending a natural rubber to a chloroprene rubber as above can improve low temperature characteristics. Patent Document 4 also describes blending of a chloroprene rubber and a natural rubber. Unfortunately, the composition includes sulfur as a co-vulcanizing agent. This deteriorates heat resistance or permanent compression set at high temperature, thereby failing to achieve such an effect as the chloroprene rubber composition of the embodiment.

However, a natural rubber included in an amount of less than 5% by mass based on the total amount of rubber components can fail to achieve sufficient effect of improving low temperature characteristics due to the combination use of the natural rubber. A natural rubber included in an amount of more than 40% by mass based on the total amount of rubber components reduces the heat resistance and the permanent compression set at high temperature of an article including a chloroprene rubber as a matrix. Thus, in the chloroprene rubber composition of the embodiment, the blending ratio of the chloroprene rubber and the natural rubber (chloroprene rubber/natural rubber) is 60/40 to 95/5 by mass ratio.

[Ethylene Thiourea: 0.1 to 3.0 Parts by Mass]

Ethylene thiourea is a vulcanization accelerator and has an effect of increasing the vulcanization density of a chloroprene rubber to improve mechanical strength. However, ethylene thiourea included in an amount of less than 0.1 part by mass based on 100 parts by mass of the rubber component can fail to achieve sufficient effects of improving the mechanical strength and the low temperature permanent compression set.

Ethylene thiourea included in an amount of more than 3.0 parts by mass based on 100 parts by mass of the rubber component accelerates vulcanization speed to deteriorate processing characteristics during molding. Here, the processing characteristics is also called "processing safety" and is evaluated by scorch time. The processing characteristics greatly affect the incidence of defective. For example, a short scorch time leads to vulcanization of unvulcanized components during molding at high temperature and this increases the frequency of occurrence of molding defective. Thus, the amount of ethylene thiourea is 0.1 to 3.0 parts by mass based on 100 parts by mass of the rubber component.

[Dipentamethylenethiuram Tetrasulfide: 0.1 to 3.0 Parts by Mass]

Dipentamethylenethiuram tetrasulfide is also a vulcanization accelerator and has effects of co-vulcanizing chloroprene and a natural rubber thus to increase mechanical strength and to improve permanent compression set at low temperature. However, dipentamethylenethiuram tetrasulfide included in an amount of less than 0.1 part by mass based on 100 parts by mass of the rubber component provides insufficient effects of improving mechanical strength and low temperature permanent compression set. Dipentamethylenethiuram tetrasulfide included in an amount of more than 3.0 parts by mass accelerates vulcanization speed to fail to ensure sufficient processing characteristics. Thus, the amount of dipentamethylenethiuram tetrasulfide is 0.1 to 3.0 parts by mass based on 100 parts by mass of the rubber component.

The chloroprene rubber composition of the embodiment uses the chloroprene rubber including a 2,3-dichlorobutadiene unit in an amount of 5 to 20% by mass and includes the chloroprene rubber and the natural rubber (chloroprene rubber/natural rubber) in a blending ratio of 60/40 to 95/5 by mass ratio. Hence, the composition can provide a vulcanizate and a vulcanized molding excellent in both the low temperature characteristics and the permanent compression set at high temperature.

The chloroprene rubber composition includes ethylene thiourea and dipentamethylenethiuram tetrasulfide in combination as vulcanization accelerators in respective amounts of 0.1 to 3.0 parts by mass with respect to 100 parts by mass of the rubber component. Hence, the composition can achieve a good balance among mechanical strength, low temperature permanent compression set, and processing characteristics.

(Second Embodiment)

Next, a vulcanizate of a second embodiment of the present invention will be described. The vulcanizate of the embodiment is obtained by adding a vulcanizing agent to the chloroprene rubber composition of the first embodiment described above, then kneading the mixture at a vulcanization temperature or below, and vulcanization. The vulcanization temperature during the vulcanization can be appropriately set depending on the composition of a chloroprene rubber composition and the type of a vulcanizing agent. The vulcanization temperature is commonly preferably in a range of 140 to 190° C. and more preferably in a range of 150 to 180° C.

Examples of the vulcanizing agent capable of being added to the chloroprene rubber composition of the embodiment include elemental metals such as beryllium, magnesium, zinc, calcium, barium, germanium, titanium, tin, zirconium, antimony, vanadium, bismuth, molybdenum, tungsten, tellurium, selenium, iron, nickel, cobalt, and osmium and oxides and hydroxides of them. Among these metal compounds, calcium oxide, zinc oxide, antimony dioxide, antimony trioxide, and magnesium oxide are especially preferred because such a compound has high vulcanization effect. These vulcanizing agents may be used in combination of two or more of them.

The vulcanizate of the embodiment may include, as necessary, a softener, a filler, a reinforcement, a plasticizer, a process aid, a lubricant, an antioxidant agent, a stabilizer, a silane coupling agent, and other additives.

The filler and the reinforcement included in the vulcanizate of the embodiment may be a filler and a reinforcement commonly used for chloroprene rubbers and examples include carbon black, silica, clay, talc, and calcium carbonate.

The plasticizer may also be a plasticizer commonly used for chloroprene rubbers and examples include dioctyl phthalate and dioctyl adipate.

The antioxidant agent may be an antioxidant agent commonly used for chloroprene rubbers. Usable examples specifically include an amine antioxidant agent, an imidazole antioxidant agent, a metal carbamate, a phenol antioxidant agent, and wax. These antioxidant agents may be used singly or in combination. In particular, among these antioxidant agents, using, for example, 4,4'-bis(α,α-dimethylbenzyl) diphenylamine and octylated diphenylamine enables a polychloroprene elastomer composition to have improved heat resistance.

The softener may be a softener commonly used for chloroprene rubbers. Usable examples specifically include petroleum softeners such as lubricant, process oil, paraffin, liquid paraffin, vaseline, and petroleum asphalt; and vegetable oil softeners such as rapeseed oil, linseed oil, castor oil, and coconut oil. These softeners may be used singly or in combination of them.

The vulcanizate of the embodiment uses the chloroprene rubber composition of the first embodiment described above and thus is excellent in low temperature characteristics as well as permanent compression set and mechanical strength at high temperature.

(Third Embodiment)

A molding of a third embodiment of the present invention will be described next. The molding of the embodiment is obtained by vulcanization of the chloroprene rubber composition of the first embodiment described above after or concurrently with molding of the composition. The molding method is not particularly limited and press molding, injection molding, extrusion molding, and other molding can be employed. For example, for a molding to be used as a wiper blade or a vibration isolator such as a rubber vibration isolator for automobiles and an industrial rubber vibration isolator, press molding or injection molding can be employed for the molding.

The molding of the embodiment uses the chloroprene rubber composition of the first embodiment described above and thus has excellent low temperature characteristics such as low temperature permanent compression set and dynamic characteristics at low temperature and has good permanent compression set, mechanical strength, and processing characteristics also at high temperature thus to obtain excellent characteristics within a wide temperature region.

EXAMPLES

Advantageous effects of the present invention will be specifically described with reference to examples and comparative examples of the present invention hereinbelow. In the examples, chloroprene rubber compositions of Examples 1 to 3 and Comparative Examples 1 to 8 were prepared in accordance with the formulations shown in Table 1 and the characteristics of the compositions were evaluated.

TABLE 1

| | | Example 1 | Example 2 | Example 3 | Comparative Example 1 | Comparative Example 2 | Comparative Example 3 |
|---|---|---|---|---|---|---|---|
| Rubber component (100 parts by mass in total) | Chloroprene (% by mass) | 60 | 95 | 60 | 60 | 60 | 60 |
| | 2,3-Dichlorobutadiene unit (% by mass) in chloroprene | 7 | 7 | 20 | 3 | 25 | 7 |
| | Natural rubber (% by mass) | 40 | 5 | 40 | 40 | 40 | 40 |
| Vulcanization accelerator | Ethylene thiourea (part by mass) | 0.6 | 0.6 | 0.6 | 0.6 | 0.6 | 0 |
| | Dipentamethylenethiuram tetrasulfide (part by mass) | 2 | 2 | 2 | 2 | 2 | 2 |
| Vulcanizing agent | MgO (part by mass) | 2.4 | 2.4 | 2.4 | 2.4 | 2.4 | 2.4 |
| | ZnO (part by mass) | 5 | 5 | 5 | 5 | 5 | 5 |
| Process aid | Stearic acid (part by mass) | 0.5 | 0.5 | 0.5 | 0.5 | 0.5 | 0.5 |
| antioxidant agent | 4,4'-Bis(α,α-dimethylbenzyl)diphenylamine (part by mass) | 5 | 5 | 5 | 5 | 5 | 5 |
| | N-Phenyl-N'-(1,3-dimethylbutyl)-p-phenylenediamine (part by mass) | 0.5 | 0.5 | 0.5 | 0.5 | 0.5 | 0.5 |
| Filler | Carbon black (part by mass) | 60 | 60 | 60 | 60 | 60 | 60 |

TABLE 1-continued

|  |  | Comparative Example 4 | Comparative Example 5 | Comparative Example 6 | Comparative Example 7 | Comparative Example 8 |
|---|---|---|---|---|---|---|
| Rubber component (100 parts by mass in total) | Chloroprene (% by mass) | 60 | 60 | 60 | 40 | 100 |
|  | 2,3-Dichlorobutadiene unit (% by mass) in chloroprene | 7 | 7 | 7 | 7 | 7 |
|  | Natural rubber (% by mass) | 40 | 40 | 40 | 60 | 0 |
| Vulcanization accelerator | Ethylene thiourea (part by mass) | 5 | 0.6 | 0.6 | 0.6 | 0.6 |
|  | Dipentamethylenethiuram tetrasulfide (part by mass) | 2 | 0 | 5 | 2 | 2 |
| Vulcanizing agent | MgO (part by mass) | 2.4 | 2.4 | 2.4 | 2.4 | 2.4 |
|  | ZnO (part by mass) | 5 | 5 | 5 | 5 | 5 |
| Process aid | Stearic acid (part by mass) | 0.5 | 0.5 | 0.5 | 0.5 | 0.5 |
| antioxidant agent | 4,4'-Bis(α,α-dimethylbenzyl)diphenyl amine (part by mass) | 5 | 5 | 5 | 5 | 5 |
|  | N-Phenyl-N'-(1,3-dimethylbutyl)-p-phenylenediamine (part by mass) | 0.5 | 0.5 | 0.5 | 0.5 | 0.5 |
| Filler | Carbon black (part by mass) | 60 | 60 | 60 | 60 | 60 |

Next, each chloroprene rubber composition of Examples and Comparative Examples was evaluated by the methods in the conditions described below.

(Hardness)

A test piece was prepared in accordance with JIS K 6250 (vulcanization condition: 160° C. for 10 minutes), and the hardness of each vulcanizate (vulcanized rubber) was determined in accordance with JIS K 6253.

(Processing Characteristics)

The scorch time of each chloroprene rubber composition of Examples and Comparative Examples was determined at 125° C. in accordance with JIS-K 6300. In the evaluation, a composition having a scorch time of 7 minutes or more was evaluated as good processing characteristics.

(Tensile Strength)

A test piece was prepared in accordance with JIS K 6250 (vulcanization condition: 160° C. for 10 minutes), and the test piece was subjected to tensile test in accordance with JIS K 6253, thereby determining the strength and the elongation of each vulcanizate (vulcanized rubber).

(Permanent Compression Set)

Each chloroprene rubber composition of Examples and Comparative Examples was vulcanized at 160° C. for 15 minutes, and the vulcanizate was subjected to the test in accordance with JIS K 6262 in a temperature condition of 120° C. for 70 hours, thereby determining the permanent compression set.

(Low Temperature Permanent Compression Set)

Each chloroprene rubber composition of Examples and Comparative Examples was vulcanized at 160° C. for 15 minutes, and the vulcanizate was subjected to the test in accordance with JIS K 6262 in a temperature condition of −10° C. for 70 hours, thereby determining the permanent compression set.

(Brittleness Temperature)

A test piece was prepared in accordance with JIS K 6250 (vulcanization condition: 160° C. for 10 minutes), and the test piece was subjected to low temperature impact brittleness test in accordance with JIS K 6261, thereby determining the brittleness temperature.

Table 2 collectively shows the results above. In the examples, for the low temperature characteristics, a sample having a low temperature permanent compression set of 35% or less and a brittleness temperature of −40° C. or less was evaluated as good.

TABLE 2

|  |  | Example 1 | Example 2 | Example 3 | Comparative Example 1 | Comparative Example 2 | Comparative Example 3 |
|---|---|---|---|---|---|---|---|
| Composition | 2,3-Dichlorobutadiene (% by mass) in chloroprene | 7 | 7 | 20 | 3 | 25 | 7 |
|  | Chloroprene/natural rubber (mass ratio) | 60/40 | 95/5 | 60/40 | 60/40 | 60/40 | 60/40 |
|  | Ethylene thiourea (part by mass) | 0.6 | 0.6 | 0.6 | 0.6 | 0.6 | 0 |
|  | Dipentamethylenethiuram tetrasulfide (part by mass) | 2 | 2 | 2 | 2 | 2 | 2 |

TABLE 2-continued

| Evaluation | | | | | | | |
|---|---|---|---|---|---|---|---|
| | Hardness | 50 | 55 | 50 | 49 | 50 | Not vulcanized |
| | Scorch time (min) | 7.7 | 13.2 | 8 | 7.2 | 8.1 | Not vulcanized |
| | Tensile strength (MPa) | 17.2 | 16.8 | 16.3 | 17.8 | 15.9 | Not vulcanized |
| | Elongation (%) | 620 | 670 | 670 | 690 | 700 | Not vulcanized |
| | Permanent compression set (%) | 49 | 41 | 50 | 54 | 65 | Not vulcanized |
| | Low temperature permanent compression set (%) | 31 | 35 | 32 | 85 | 31 | Not vulcanized |
| | Brittleness temperature (° C.) | −46 | −40 | −42 | −43 | −40 | Not vulcanized |

| | | Comparative Example 4 | Comparative Example 5 | Comparative Example 6 | Comparative Example 7 | Comparative Example 8 |
|---|---|---|---|---|---|---|
| Composition | 2,3-Dichlorobutadiene (% by mass) in chloroprene | 7 | 7 | 7 | 7 | 7 |
| | Chloroprene/natural rubber (mass ratio) | 60/40 | 60/40 | 60/40 | 40/60 | 100/0 |
| | Ethylene thiourea (part by mass) | 5 | 0.6 | 0.6 | 0.6 | 0.6 |
| | Dipentamethylenethiuram tetrasulfide (part by mass) | 2 | 0 | 5 | 2 | 2 |
| Evaluation | Hardness | 50 | 49 | 50 | 43 | 59 |
| | Scorch time (min) | 5.1 | 11.4 | 6.4 | 4.5 | 13.6 |
| | Tensile strength (MPa) | 18.6 | 13.3 | 17.5 | 14.8 | 17.2 |
| | Elongation (%) | 590 | 830 | 600 | 880 | 680 |
| | Permanent compression set (%) | 51 | 62 | 59 | 99 | 39 |
| | Low temperature permanent compression set (%) | 33 | 96 | 38 | 42 | 38 |
| | Brittleness temperature (° C.) | −46 | −47 | −47 | −52 | −39 |

As shown in Table 2, Comparative Example 1, which used the chioroprene including the 2,3-dichlorobutadiene unit in an amount of less than 5% by mass, was inferior in the low temperature permanent compression set. Comparative Example 2, which used the chloroprene including the 2,3-dichlorobutadiene unit in an amount of more than 20% by mass, was inferior in the permanent compression set at a high temperature (120° C.) and brittleness temperature.

Comparative Example 3, which included no ethylene thiourea and included dipentamethylenethiuram tetrasulfide alone, failed to be vulcanized and thus was unavailable for the evaluation. Comparative Example 4, which included ethylene thiourea in an amount of more than 3.0 parts by mass, had a short scorch time and thus was inferior in the processing characteristics.

Comparative Example 5, which included no dipentamethylenethiuram tetrasulfide, was inferior in the low temperature permanent compression set. Comparative Example 6, which included dipentamethylenethiuram tetrasulfide in an amount of more than 3.0 parts by mass, had a short scorch time and thus was inferior in the processing characteristics.

Comparative Example 7, which included the chioprene rubber and the natural rubber in a blending ratio of 40/60 and thus included the natural rubber in an amount of more than 40% by mass, had a low heat resistance to be inferior in the permanent compression set at a high temperature (in a temperature condition of 120° C.). Comparative Example 7 had a short scorch time and thus was also inferior in the processing characteristics. Comparative Example 8, which included no natural rubber, had a high hardness, was inferior in the permanent compression set at a high temperature, and was also inferior in the low temperature permanent compression set and the brittleness temperature.

In contrast to Comparative Examples, it was ascertained that Example 1, which included the chloroprene rubber including the 2,3-dichlorobutadiene unit in an amount of 5 to 20% by mass and the natural rubber in a ratio of 60/40 to 95/5 (mass ratio) and further included ethylene thiourea in an amount of 0.1 to 3.0 parts by mass and dipentamethylenethiuram tetrasulfide in an amount of 0.1 to 3.0 parts by mass with respect to 100 parts by mass of the rubber components, had no difference between the low temperature permanent compression set and the high temperature permanent compression set and thus obtained characteristics having good balance within a region from a low temperature to a high temperature. Examples 1 to 3 had a scorch time, which suggests the processing characteristics, of 7 minutes or more and thus were ascertained to also be excellent in the processing characteristics.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A chloroprene rubber composition comprising rubber components consisting entirely of a chloroprene rubber and a natural rubber in an amount of 100 parts by mass;
   ethylene thiourea in an amount of 0.1 to 3.0 parts by mass; and dipentamethylenethiuram tetrasulfide in an amount of 0.1 to 3.0 parts by mass;
wherein the chloroprene rubber includes a 2,3-dichlorobutadiene unit in an amount of 5 to 20% by mass; and
the blending ratio of the chloroprene rubber and the natural rubber (chloroprene rubber/natural rubber) is 60/40 to 95/5 by mass ratio, said rubber components being free of sulfur used as a vulcanization agent.

2. A vulcanizate obtained by vulcanization of the chloroprene rubber composition according to claim 1.

3. A molding obtained by vulcanization of the chloroprene rubber composition according to claim 1 after or during molding of the composition.

4. The chloroprene rubber composition according to claim 1, wherein the chloroprene rubber is a copolymer of 2-chloro-1,3-butadiene and 2,3-dichlorobutadiene.

5. A chloroprene rubber composition consisting essentially of a chloroprene rubber and a natural rubber in a total amount of 100 parts by mass;
ethylene thiourea in an amount of 0.1 to 3.0 parts by mass;
dipentamethylenethiuram tetrasulfide in an amount of 0.1 to 3.0 parts by mass;
the chloroprene rubber contains a 2,3-dichlorobutadiene unit in an amount of 5 to 20% by mass; and
a blending ratio of the chloroprene rubber and the natural rubber (chloroprene rubber/natural rubber) is 60/40 to 95/5 by mass ratio, said composition being free of sulfur used as a vulcanization agent.

6. A vulcanizate obtained by vulcanization of the chloroprene rubber composition according to claim 5.

7. The vulcanizate according to claim 6 including at least one additive selected from the group consisting of a softener, a filler, a reinforcement, a plasticizer, a process aid, a lubricant, an antioxidant agent, a stabilizer and a silane coupling agent.

8. A molding obtained by vulcanization of the chloroprene rubber composition according to claim 5 after or during molding of the composition.

9. A chloroprene rubber composition according to claim 5, wherein the chloroprene rubber is a copolymer of 2-chloro-1,3-butadiene and 2,3-dichlorobutadiene.

10. The vulcanizate according to claim 2 including at least one additive selected from the group consisting of a softener, a filler, a plasticizer, a process aid, a lubricant, an antioxidant, a stabilizer and a silane coupling agent.

11. The chloroprene rubber composition according to claim 1, wherein the chloroprene rubber contains the 2,3-dichlorobutadiene unit in an amount of 7% to 20% by mass.

12. The chloroprene rubber composition according to claim 5, wherein the chloroprene rubber contains the 2,3-dichlorobutadiene unit in an amount of 7% to 20% by mass.

* * * * *